United States Patent [19]

Mosher et al.

[11] Patent Number: 4,529,050

[45] Date of Patent: Jul. 16, 1985

[54] COMBINATION WEIGHING MACHINE WITH ADAPTIVE SIGNAL CORRECTION

[75] Inventors: Oren A. Mosher, Hayward; Ellwood S. Douglas, Orinda, both of Calif.

[73] Assignee: Package Machinery Co., East Longmeadow, Mass.

[21] Appl. No.: 572,661

[22] Filed: Jan. 20, 1984

[51] Int. Cl.³ ................... G01G 7/00; G01G 19/22; G01G 19/41

[52] U.S. Cl. ............................ 177/1; 177/25; 177/50; 364/567

[58] Field of Search .............. 177/1, 25, 50, DIG. 12; 364/567

[56] References Cited

U.S. PATENT DOCUMENTS

| | | | |
|---|---|---|---|
| 3,805,903 | 4/1974 | Muskat et al. | 177/50 |
| 3,986,012 | 10/1976 | Lashbough et al. | 177/25 X |
| 4,137,568 | 1/1979 | Dlugos | 177/25 X |
| 4,164,260 | 8/1979 | Blodgett | 177/50 X |
| 4,316,516 | 2/1982 | Kupper | 364/567 X |
| 4,413,739 | 11/1983 | Kohashi | 177/50 X |
| 4,448,272 | 5/1984 | Keller et al. | 177/25 X |
| 4,466,500 | 8/1984 | Mosher et al. | 177/25 X |

Primary Examiner—Thomas H. Tarcza
Assistant Examiner—Patrick W. Foster
Attorney, Agent, or Firm—McCormick, Paulding & Huber

[57] ABSTRACT

A combination weighing machine has a plurality of weigh scales which provide signals representative of the weight of product in each scale. A search control receives the weight signals and selects a combination of the scales which together compose a charge of the product equal to or closely approximating a given target weight. Transient errors existing in the weight signals at high speeds of operation are corrected by means of adjustment parameters that are periodically recalculated on the basis of known differences between settled and unsettled weight signals.

21 Claims, 6 Drawing Figures

COMBINATION WEIGHING MACHINE WITH ADAPTIVE SIGNAL CORRECTION

BACKGROUND OF THE INVENTION

The present invention relates to combination weighing machines and is concerned in particular with correction of weight signals in such machines by means of historical data derived from the scales.

In combination weighing machines, a plurality of scales receive quantities of a product, and provide an indicated weight signal representative of the weight of product deposited in the scale. Such a weighing machine is shown and described in co-pending application Ser. No. 430,354 filed Sept. 30, 1982 now U.S. Pat. No. 4,466500 by Mosher, Douglas et al. Such machines generally operate in combination with a packaging machine, and the operation of the two machines is synchronized at a high cyclic rate determined either by the packaging machine or the weighing machine. The weighing machine searches for a combination of scales that will most nearly form a charge of product at a desired weight and dumps the selected scales into a single bag or other packaging container within relatively short cycle times.

The desire to improve the production rate of packaging machinery leads to the operation of such machines at a maximum possible rate which is established either by the limitations of the packaging machine or the weighing machine. In the case of the weighing machine, the upper limit of operation is in part determined by the period of time required to drop a quantity of product into a scale and allow the scale to settle out so that a reliable, relatively steady state weight signal can be taken from the scale for conducting the combination search. The dynamic conditions associated with the depositing of the quantity of product in a scale, including the fact that the product acquires momentum as it is dropped, interfere with the weight signal from the scale and, until now, have required that in each cycle of operation, the machine allot a period of time for the scale signals to settle out (settling time).

It is an object of the present invention to improve the rate at which a combination weighing machine operates by reducing the amount of time that is allotted for settling of the weight signal during each cycle of operation. This object is achieved by making corrections to the unsettled weight signals in accordance with a correction parameter that is determined from historical data taken from the scale.

SUMMARY OF THE INVENTION

The present invention resides in a method and apparatus for operating a combination weighing machine at cyclic rates that are higher than ordinarily possible with conventional processing of the product.

The machine, which carries out the method as well, has a plurality of weigh scales, each of which receives and weighs a quantity of product that may be combined with the quantities from other scales in a current or subsequent cycle of operation to form a charge of product that will be deposited or dumped into a single package. The products deposited in each scale may be the same product or different products, depending upon the desired composition of the charge in the package. Each of the scales provides an indicated weight signal that is representative of the weight (or approximate number) of the product in the scale.

Combination search control means are connected with the scales to receive the weight signals, and conduct a search in each cycle of operation to identify a selected combination of the scales which, when dumped, forms a charge of product closely approximating a target weight. The search control requires a weight signal that accurately reflects the weight of product in a scale in order to add the respective weight signals in various combinations and accurately determine the total weight of product that could be derived from each combination. If the search operation performed by the control means is initiated before the weight signals from each scale have settled to a relatively steady value, a significant error may exist in each weight signal, and such errors are cumulative in the resulting charge of product developed from a selected combination.

In accorddance with the present invention, the accuracy of the weight signals is improved by means of an adaptive weight signal correction means which adjusts the indicated weight signal from a scale in accordance with historical data derived from the scale in previous cycles of operation. For example, it has been determined that the error in the weight signal can be predicted with reasonable accuracy before the signal has completely settled, and by appropriate adjustment of the unsettled signal, a combination search can be conducted prior to settling of the signals without loss of accuracy. The search control means is connected with the signal correcting means to employ the adjusted weight signal in the searching process, and the result is a combination weighing machine that has a higher speed of operation.

DESCRIPTION OF THE PREFERRED EMBODIMENTS

During each cycle of operation of a combination weighing machine, different functions are performed by different scales. One of the most important of these functions relates to the weighing of quantities of product after the procduct has been deposited or loaded into an empty scale. In order for the newly loaded scale to participate in the next combination search, the weight signal must be generated and read into the search control. Generally, the weigh scales include a strain gauge transducer which can respond precisely and accurately to transient as well as steady state strains imposed upon it by the scale, and since the combination weighing machines are frequently operated in a "noisy" environment due to vibration of feeders and so on, the process of taking an accurate weight reading is difficult and subject to error if the settling period of a cycle of operation is foreshortened.

The timing diagram labeled (1) exemplifies the various time intervals or periods in a cycle of operation for a scale which is dumped. The cycle is divided in accordance with a prior art combination weighing machine. $S_O$ represents the synchronization pulse that may be internally generated by a clock or received by the weighing machine from a packaging machine to indicate that the packaging machine is prepared to receive a charge of product from the scales. Interval a represents the period during which a previously weighed quantity in the scale is dumped as part of the selected combination of scales forming the charge of product to be packaged. During this interval, the scale door opens, the scale is tilted or otherwise emptied, and the door is closed again to receive a new quantity of product. Interval b represents the period during which the new quantity of product is deposited in the emptied scale from an accumulator or other feed mechanism, such as described in co-pending U.S. patent application Ser. No. 522,418 filed Aug. 11, 1983 by the inventors. Since the material is generally dropped onto the sclae, momentum and vibration effects associated with the loading of the scale are allowed to settle out during a settling period identified as interval c. Ideally, a long settling period is desired for accuracy, but it will be understood that the longer the interval for any given operation, the longer is the overall cycle of operation and the lower the cyclic packaging rate of the machine. Accordingly, it is desirable to foreshorten the intervals, including the settling period, as much as possible; however, when the settling period is reduced as indicated in the cycle labeled (2) in FIG. 1, the accuracy of the indicated weight signal is obviously depreciated.

Interval d represents the period during which the controls of the combination weighing machine sample the weight signal from the scale and obtain an average value to be used in the combination search. The averaging and sampling technique improves the overall reliability of the weight signal because random or intermittent disturbances, such as the vibrations associated with feeders and other operation of the weighing and packaging machines, can be removed from the weight signal. A sampling and averaging circuit which samples the weight signal several times prior to the search is disclosed in the co-pending U.S. application Ser. No. 430,354 referenced above. After the sampling and averaging operation takes place during the interval d shown in the cycles of operation labeled (1) (2) of FIG. 1, the combination search is conducted by the search control during the interval e. One embodiment of the searching operation is described in the referenced U.S. application Ser. No. 430,354. A synchronization pulse $S_O$ follows the interval e to identify the next cycle of operation.

Figure 1:
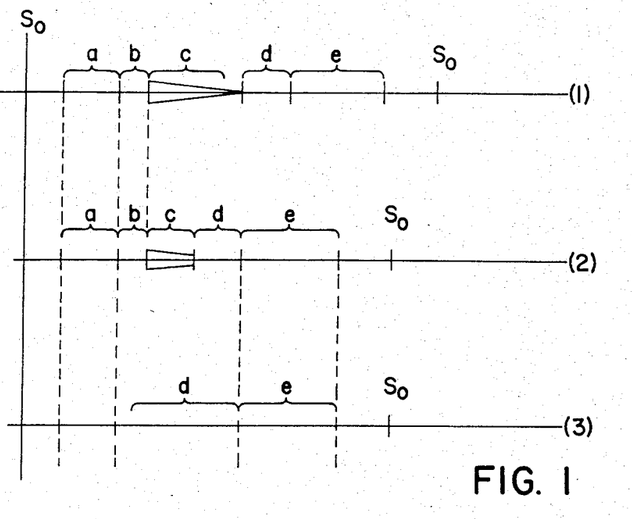
FIG. 1 is a timing diagram illustrating the various operations that occur during three different cycles of operation of a scale in a combination weighing machine.

From the above discussion, it is apparent that a foreshortening of the settling interval c as shown in the cycle (2) of FIG. 1 results in weight signals of decreased accuracy. However, with a foreshortened settling interval, the overall cycle of operation can be reduced and hence the machine can operate at a higher speed.

In addition to the cycles of operation during which a scale is dumped and reloaded, another common cycle is the WAIT cycle labeled (3) in FIG. 1 A WAIT cycle is one in which the scale under consideration has not been selected as one of the scales to be dumped, and as a consequence, the scale and its product wait until subsequent cycles of operation to be chosen. As shown in FIG. 1, the scale in the WAIT cycle (3) does not have any loading or settling intervals b, c as explained above. In addition, and in accordance with the present invention, the sampling and averaging interval d is expanded to enable a larger number of samples to be taken and a more reliable weight signal to be achieved. Reliability is insured, not only due to the longer sampling period, but more importantly due to the fact that the scale has had approximately at least a full cycle of operation for the weight signal to settle to a steady state value.

It has been established that with a uniform foreshortening of the settling time, as indicated in the cycle labeled (2) in FIG. 1, the unsettled weight signal is generally always in excess of the actual settled weight signal due to the momentum of the quantity of product dropped into the weigh scale. Furthermore, it has been determined that with increases in the cyclic rate of machine operation, the error in the unsettled weight signal tends to increase, and as the given settled weight increases, the error is larger. These trends are illustrated in the statistical data and corresonding graphs of FIG. 2. The lower curve A identifies the error E (unsettled weight $Y_u$-settled weight $Y_s$) for various settled weights $Y_s$ at a cyclic machine rate of 60 dumps per minute, while the curve B shows the error at a cyclic rate of 65 dumps per minute. The scatter of the error signals for various settled weights reflects a linear relationship, and this relationship can be used to calculate an error factor that can be used to compensate unsettled weight signals when the weighing machine is operated at increased cyclic rates. For example, at a settled weight of 25 grams, the curve A indicates that the error will be approximately 2.7 grams, and therefore, the unsettled weight signal will be approximately 27.7 grams when the weighing machine is operated at 60 dumps per minute. By establishing the slope and intercept parameters of the curve which represents the error signals, it is possible to compensate unsettled weight signals over a broad range of weights, and a series of the curves can be used by the weighing machine to correct the unsettled weight signals at various cyclic rates.

Figure 2:
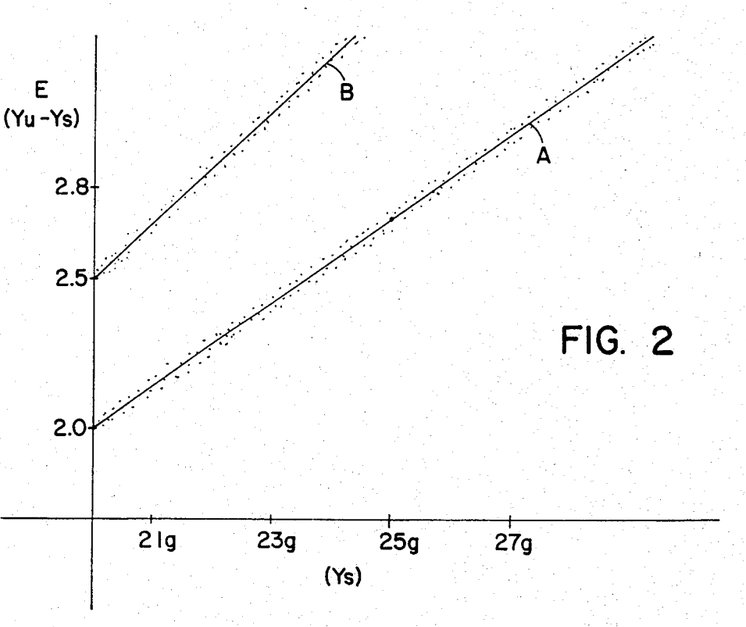
FIG. 2 is a diagram illustrating the statistical errors that exist in unsettled weight signals at different actual or settled weights and different cyclic rates of operation.

In addition to correcting unsettled weight signals, the combination weighing machine of the present invention also generates the parameters of the weight signal correction curves shown in FIG. 2 each time that a scale is loaded with a quantity of material, but is not selected as a part of the dumped combination until at least the next cycle of operation. The time that elapses between the loading of the scale in one cycle and the taking of a weight reading in the subsequent cycle or cycles is of sufficient duration for the weight signal to settle and reach a steady state value. By storing the unsettled weight signal taken during the cycle that the scale is loaded and subtracting the settled weight signal taken during the next cycle of operation, a current error characteristic or data point for the scale can be determined. This error signal is utilized in connection with other error data taken during previous cycles of operation to update the correction curve shown in FIG. 2. In the embodiment of the invention described below, the correction parameters are established based upon a weighted average of the error data sampled in previous cycles with emphasis being placed on the more recent events.

Figure 3:
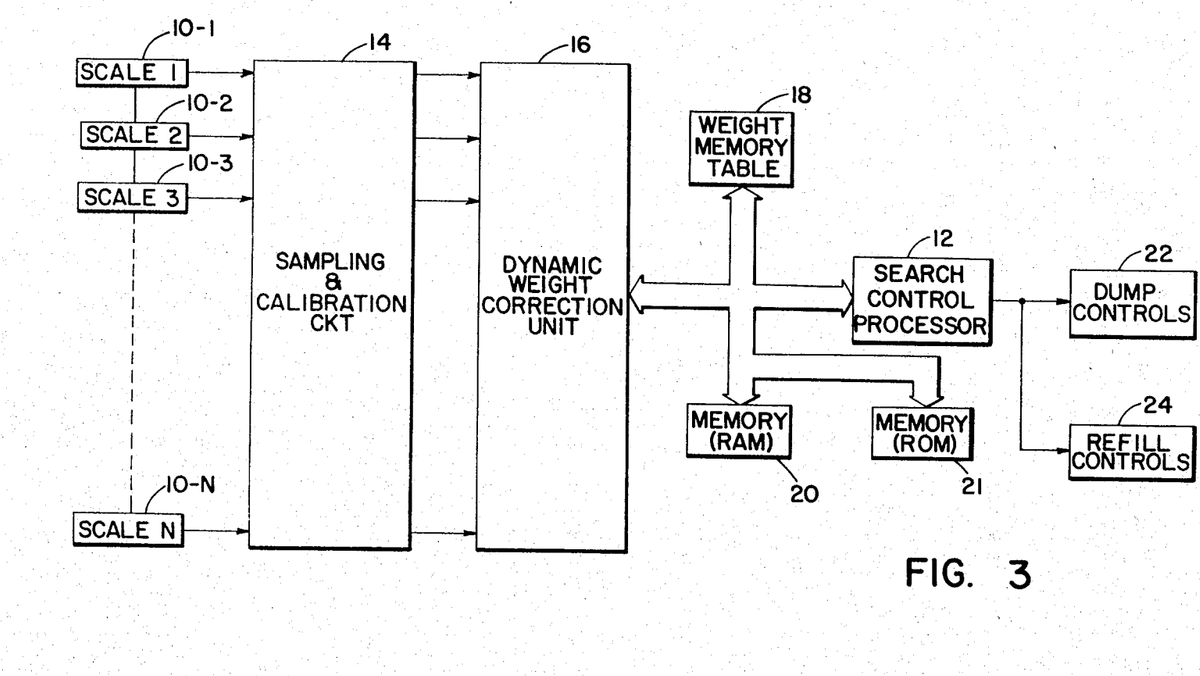
FIG. 3 is an overall block diagram illustrating the components in the combination weighing machine constructed in accordance with one embodiment of the present invention.

FIG. 3 schematically illustrates a combination weighing machine that incorporates the present invention. The machine is comprised by a plurality of weigh scales 10-1, 10-2 . . . 10-N which are loaded as needed with a quantity of product that is to be weighed and combined with the quantities of product from certain other scales in order to form a charge of product having a total weight equal or approximately equal to the given target weight. The combination of scales which is selected to be dumped to form the charge of product is determined by a microprocessor 12 in conjunction with other components of the system, and for a more detailed explanation of the microprocessor and the searching operation, reference may be had to the co-pending U.S. application Ser. No. 430,354 referenced above. The combination search is based upon the weight signals that are derived from the scales 10-1 . . . 10-N or from a lesser number of scales which have been loaded with a quantity of product and are ready to be dumped.

Figure 4:
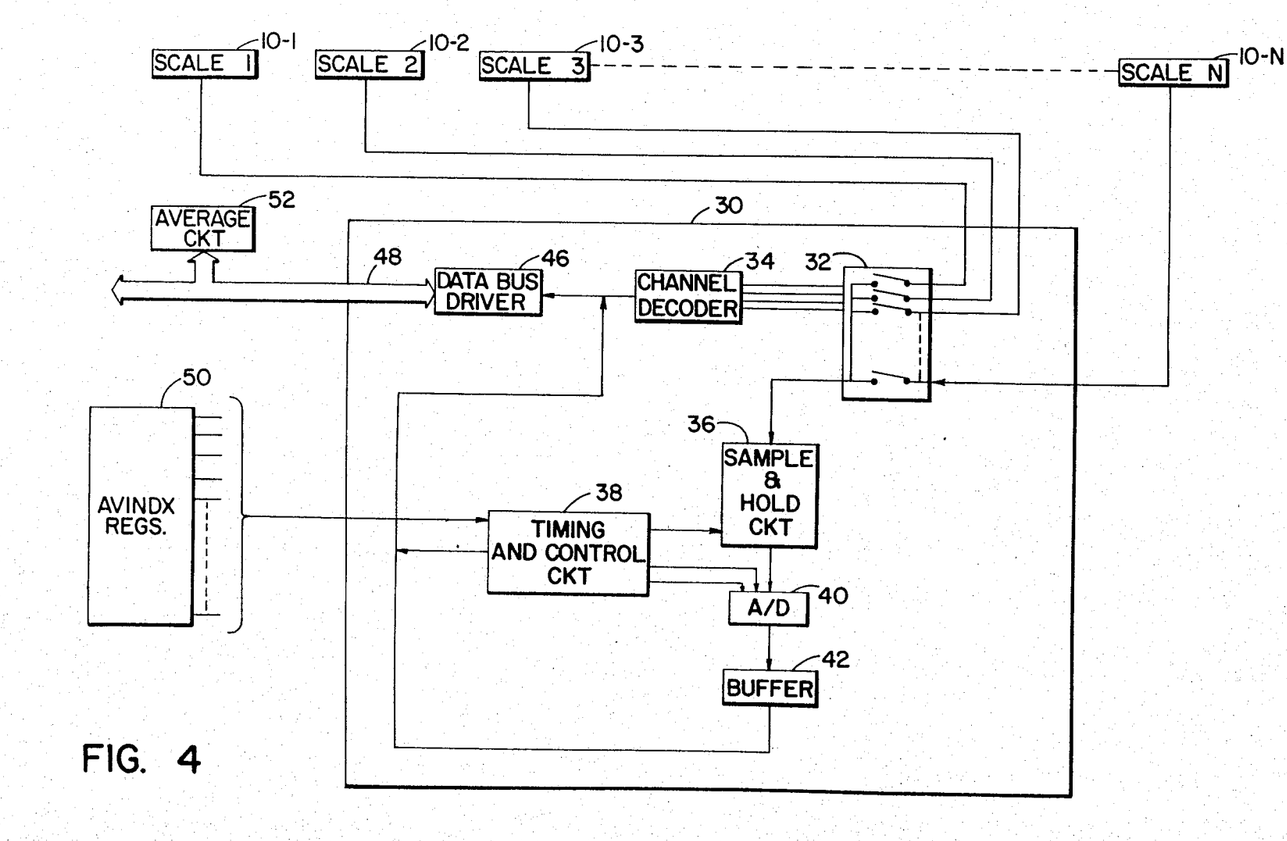
FIG. 4 is an electrical diagram illustrating the sampling circuit in one embodiment of the combination weighing machine.
Figure 5:
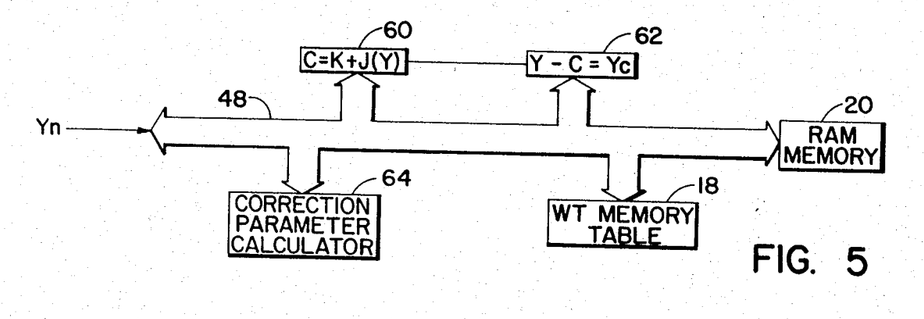
FIG. 5 is a flow chart illustrating the processing of weight signals and the correction factors in accordance with one embodiment of the present invention.
Figure 6:
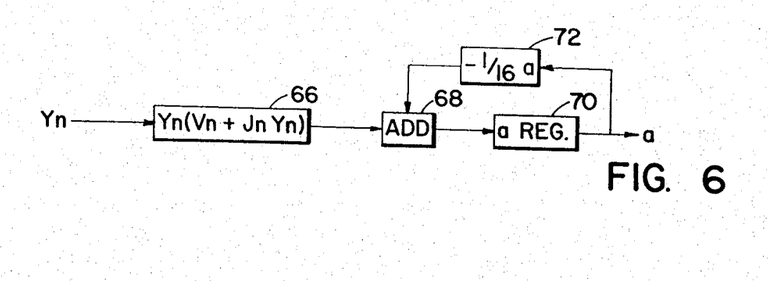
FIG. 6 is a block diagram illustrating a simplified circuit for determining the sum of a decaying series of numbers with the most recent events being most prominent in the sum.

The weight signals from the scales and upon which a search operation is based are first processed through a sampling and calibration circuit 14 described more particularly below in connection with FIG. 4, and a dynamic weight correction unit 16 which is constructed as shown in FIGS. 5 and 6. The functions performed in the correction unit include correction of unsettled weight signals as well as recalculation of the correction parameters that are employed in the correcting signals. (Reference to a correction parameter is intended to include added or subtracted constants, first and higher order coefficients or other empirical correction parameters and expressions or tables for quantitatively adjusting the unsettled weight signals).

The corrected weight signals supplied by the dynamic weight correction unit 16 are stored in a weight memory table 18 during the period of time in which the search control processor 12 performs a searching operation to establish the preferred combination of scales to be dumped. The processor operates from a stored program in the read only memory 21. The random access memory 20 is used to store critical data that is employed during the correction and searching operations. After a given combination of the scales 10 has been selected, the processor 12 actuates dump controls 22 to dump the selected combination of scales and subsequently actuates the refill controls 24 to cause the dumped scales to be reloaded as needed. The processor 12 may also perform other functions, such as balancing or taring the scales at periodic intervals.

FIG. 4 illustrates the scales 10-1. . . 10-N and a portion of the sampling and calibration circuit 14 connected to the scales for taking a series of samples of the weight signals from each scale during the sampling and averaging period d shown in the exemplary scale cycles of FIG. 1. The sampling circuit 30 shown in FIG. 4 is similar to that shown and described in the co-pending application Ser. No. 430,354 referenced above except that the circuit has been modified in order to vary the sampling period in accordance with the present invention.

The sampling circuit 30 has a multiplexer unit 32 with inputs that are connected respectively to each of the scales 10. The multiplexer is driven by means of a channel decoder 34 to permit each of the indicated weight signals from the scales to be individually processed through the multiplexer to a sample and hold circuit 36. The decoder 34, the circuit 36, and the remaining components of the sampling circuit 30 are all controlled by a timing and control circuit 38. For example, the control circuit 38 causes the decoder 34 to operate the multiplexer so that the indicated weight signals from the scales 10 are sequentially sampled and loaded into the sample and hold circuit 36. The sampled signals are transferred serially from the circuit 36 to an analog-to-digital converter 40, and the digital signals are supplied to a buffer 42 prior to being transmitted through a data bus driver 44 to a data bus 46 within the search control processor (FIG. 3).

A number of analog samples are taken from each of the weight signals by the circuit 36 during the terminal portion of the sampling period d in FIG. 1. The number taken is varied depending upon the type of cycle which a scale is executing, and is also determined by the timing and control circuit 38 in response to signals derived from AVINDX registers 50 within the search control processor 12. An AVINDX register is provided for each of the scales in the machine, and in one embodiment of the invention, takes the form of a one-byte register that identifies the current state or type of cycle being performed by the associated scale. Since the weight signals from each of the loaded scales must be sampled and each scale has a state of operation that is independent of the other scales, the AVINDX registers provide appropriate signals to the timing and control circuit 38. The table below lists various codes that appear in the AVINDX register along with the sampling and correcting instructions that are appropriate for the type of scale cycle which is associated with the codes.

| CODE | INSTRUCTIONS |
| --- | --- |
| 4 | Make no measurement. |
| 3 | Not used. |
| 2 | Take a short average, make a correction. |
| 1 | Take a long average, adjust the correction parameters. |
| 0 | Take a long average. Make no correction or adjustment. |

The code values are set as soon as the combination search has been performed and the scales to be dumped have been selected. A code 4 indicates no measurement should be taken from the scale. This code is used in situations, for example, where the scale has been emptied and a taring operation is being performed to recalibrate the signals from the scale. Code 3 is not used.

Codes 2, 1, and 0 are of particular importance with respect to the present invention. Code 2 is set for those scales which have been selected to be part of the combination to be dumped and indicates that after the scale has been reloaded, the sampling and hold circuit should take a short series of samples for averaging. For example, the indicated weight signal may be sampled during an 80-millisecond period at 5-millisecond intervals to obtain a total of 16 samples. The samples are then processed through the converter 40 to the data bus 48 and an averaging circuit 52 connected to the bus. The averaging circuit adds each of the samples to one another, and then divides the total by the number of samples taken to obtain an average indicated weight signal that is effectively free of intermittent or random errors present in the weight signals. An averaging circuit of this type is described in greater detail in the copending application Ser. No. 430,354 referenced above.

Since a code 2 in the AVINDX register indicates that the scale was just loaded, the weight signal obtained as a result of the averaging is an unsettled weight signal which requires correction in view of the inherent error discussed and illustrated in connection with FIG. 2. As explained in further detail below, an adjustment is made to the unsettled signal before the signal is utilized in a combination search.

Code 1 is the code used for those scales which are in a WAIT cycle, that is, a cycle in which the scale has not been selected to be dumped, and as a consequence, a longer sampling period or a greater number of samples of the weight signal can be taken and averaged. For example, instead of 16 samples, 64 samples can be taken five milliseconds apart because the weight signal from the scale has had, at a minimum, almost a complete cycle of operation to settle. With the higher number of samples and the much greater settling time, an accurate measure of the settled weight signal is obtained. As is discussed in further detail below, this accurately measured signal is used to recalculate the correction parameters utilized with unsettled weight signals.

Code 0 is similar to a code 1, but is utilized in the second and subsequent WAIT cycles after dumping. During such cycles, the settled weight signal is again sampled for a longer period of time, but no correction of the signal nor adjustment of the correction parameters is made. The taking of another long sample assures that the most current weight information is utilized in the combination search.

FIG. 5 illustrates in a flow diagram the basic components of the dynamic weight correction unit 16 of FIG. 3. Within the correction unit, the unsettled weight signals are corrected and supplied to the weight memory table 18 prior to the combination search operation. Additionally, the correction parameters are recalculated periodically based upon the settled weight signals taken during a WAIT cycle. Of course, the settled weight signals do not require correction, and are supplied directly to the memory table 18 for the combination search.

The portion of the correction unit 16 which corrects the unsettled weight signals in FIG. 5 includes an arithmetic circuit 60 which calculates an unsettled error C based upon the indicated unsettled weight signal Y derived from the sampling and averaging circuits. In a preferred embodiment of the invention, the arithmetic circuit 60 is actually a subroutine in the operating program of the control processor 12; however, a simple mathematic operations can be performed to obtain the error value by either digital or analog circuits with appropriate program control.

As shown in FIG. 2, the error in the indicated weight signal that is taken a predetermined time after a scale is loaded and before settling, can be determined from a first order linear equation. In the circuit 60 of FIG. 5, therefore, a first order linear equation is shown as follows:

$$C = K + J(Y).$$

wherein
C is weight signal error
K is the intercept value
J is the slope

It is possible that other variables than the indicated weight signal Y may be employed alone or in combination with Y or each other, such as the weight dumped in the last cycle or a timing measurement associated with the dumping of product from the scale. It is also possible to employ other correction formulas, such as a constant correction (K) by itself or more complex higher order, logarithmic or empirically derived and programmed correction schemes and parameters. The linear approximation, however, has proven successful in improving the cyclic rates of the machine without loss of accuracy in the charges of product produced. Accordingly, the linear correction is discussed in greater detail.

After the weight signal error C has been determined by the circuit 60, a simple arithmetic subtracting circuit 62 combines the error and the weight signal Y to obtain a corrected weight signal Yc. The corrected signal Yc is then transmitted through the data bus 48 to the weight memory table 18 so that it may be used in a combination search. The uncorrected, unsettled signal Y is also transmitted to the memory 20 for use in recalculating the correction parameters K, J in subsequent cycles of operation.

It should be understood that the weight error C and associated parameters K, J are different for each scale, since each scale has different operating characteristics. Consequently, the RAM memory 20 must store the parameters K, J for each scale to be used by the arithmetic circuit 60 whenever an unsettled weight signal is received from the corresponding scale.

In addition to correcting the unsettled weights in accordance with the correction parameters K, J, the dynamic weight correction unit 16 also includes a correction parameter calculator 64 which periodically determines the correction parameters for each scale based upon the historical weight data that has been taken from the respective scale, such data specifically being the settled and unsettled weights. The calculation of the parameters is intended to fit the linear or other correction curve to the observed data by the method known as the least squares curve fitting. This process is discussed in detail in the book entitled "Introduction to Engineering Measurements" by C. F. Scheffey and published by California Book Co., Ltd., Berkeley, Calif. Least squares curve fitting is a well known and accepted process for developing equations that most accurately fit experimental data, and involves statistical mathematics.

It can be shown through the least squares method that new parameters J and K in the linear equation solved by the arithmetic circuit 60 are given by the expressions $$J = \frac{\Sigma Yn(Vn + JnYn)}{\Sigma Yn\, Yn} = \frac{a}{b}$$

$$K = \frac{\Sigma(Vn + Kn)}{N} = \frac{c}{n}$$

where
Yn is the indicated settled weight for data point n;
Vn is the deviation of the calculated weight error C from the actual error or difference between settled and unsettled weights;
Jn is the current slope in the correction curve at a given cyclic rate;
Kn is the current intercept of the correction curve; and
N is the total number of previous data points.

The sums shown in the numerators and denominator contain a number of terms equal to the number of data points that have been used to establish the correction curve. Obviously, when a weighing machine is initially started, the correction factors are not totally accurate because of the limited data that is available. Additionally, if the data associated with each point is stored indefinitely in memory to calculate the new J and K parameters, substantial memory capacity would be required for the accumulated data. To this end, an alternative digital technique is employed to obtain a substitute sum for each of the numerators (a), (c) and denominator (b), which sum represents a running average value for the numerator and denominator with a decay feature that weighs the most recent events or data more heavily. This alternative is preferable to the rigorous solution of the lengthy sums involved with the parameters J, K as given above, and also permits the calculation of the parameters in a more practical manner.

FIG. 6 illustrates a weighted averaging circuit for determining the value of the numerator (a) for the new parameter J with the abbreviated alternative technique. The variable $Y_n$ is the current settled weight signal that is obtained from the scale whose parameters are being recalculated. The weight signal is a settled signal, because it is obtained during a WAIT cycle subsequent to the calculation of a corrected weight signal $Y_c$. The expression $Y_n(V_n + J_n Y_n)$ is calculated in an arithmetic circuit 66 using the then existing value of $J_n$. The deviation $V_n$ is readily determined on the basis of the difference between the settled and unsettled weight signals that have been read from the scale during the preceding DUMP cycle and the current WAIT cycle and the calculated signal error C determined during the preceding DUMP cycle.

When the numerical value of the expression is determined in the circuit 66, it is added to a number stored in the register 70 by means of an algebraic adder 68. The value (a) stored in the register represents the running value of the numerator (a). However, before the addition to the register value, a fractional portion of the value is subtracted from the register by the algebraic adder 68 with the aid of a proportioning circuit 72. The proportioning circuit reads the old value of the numerator (a) and reduces it by a decay factor, such as 1/16, for subtraction from the value in the register. In effect this subtraction removes a portion of all of the older terms in the sum forming the numerator (a) and permits the newer or more recent terms to dominate the numerator. In other words, the older terms in the sum decay at a rate determined by the proportioning circuit and the newer terms forming the sum are weighed more heavily in the numerical value of (a). Weighted averaging circuits similar to those shown in FIG. 6 are utilized to calculate the values of the denominator (b) and the numerator (c). The number N in the equation for the parameter K would be a continually increasing number; however, in the alternative technique for determining the parameters J, K, the value is a constant equal to the decay factor.

The registers 70 for each of the scales may form a part of the RAM memory 20 or may be part of the internal memory within the control processor 12.

Accordingly, each time a settled and unsettled weight is measured from a particular scale, the correction parameters J, K are recalculated for use in determining weight errors C in the next DUMP cycle for that scale. In this manner, the weighing machine can be operated at a higher cyclic rate due to foreshortened settling periods, and the correction parameters are updated based upon historical data derived from the scales. Thus constituted, the dynamic weight correction unit 16 is an adaptive weight signal correcting means for adjusting the indicated weight signals from the scales in accordance with the historical data, and the control processor 12 carries out a search operation on the basis of the adjusted weight signals. The invention is especially suited to combination weighing machines in which certain of the scales are selected for dumping, and the remainder of the scales wait until another cycle of operation. In the meantime, the waiting scales settle and permit an actual measurement of the weight and weight error to be determined for adjusting the correction parameters.

While the present invention has been described in the preferred embodiment, it should be understood that numerous modifications and substitutions can be made without departing from the spirit of the invention. For example, the correction error C can be based upon a number of correction equations or more arbitrarily established curves that are derived and made to conform to the actual error between settled and unsettled weights. The linear correction factor described has been shown to provide a significant improvement in the cyclic rate of a combination weighing machine without sacrificing accuracy. The actual hardware employed to perform the basic mathematic functions involved in determining the correction error or the recalculation of the correction parameters may be performed by analog or digital equipment with appropriate programming control. The correction parameters can also be recalculated on the basis of the most recent or a finite number of recent data points rather than the decayed infinite series disclosed. Accordingly, the present invention has been described in a preferred embodiment by way of illustration rather than limitation.

We claim:

1. In a combination weighing machine having a plurality of weigh scales, each receiving and weighing a quantity of product and providing an indicated weight signal for the product in the scale, and combination search control means connected with the scales to receive the weight signals for identifying in each cycle of operation a selected combination of the scales to be dumped for forming a charge of product closely approximating a target weight, the improvement comprising adaptive weight signal correcting means for adjusting unsettled indicated weight signals from a scale in accordance with historical data derived from the scale in previous cycles of operation, the search control means being connected to receive the adjusted weight signal for searching for the selected combination in one cycle of operation.

2. In a combination weighing machine, the improvement as defined in claim 1 wherein the adaptive weight signal correcting means includes first means receiving the indicated weight signals after each new quantity of product is deposited in the scale and prior to settling of the signal to a more stable value for quantitatively adjusting the weight represented by the indicated signal by means of an adjustment parameter based upon the historical data; and second means for recalculating the adjustment parameter after the scale retains a deposited quantity of product and the indicated weight signal has settled to a stable value.

3. In a combination weighing machine the improvement as defined in claim 2 wherein the means for recalculating is engaged after the indicated signal has settled for approximately one cycle of the machine.

4. In a combination weighing machine the improvement as defined in claim 2 further including
memory means for storing an unsettled indicated weight signal as historical data; and
the means for recalculating the adjustment parameter is connected with the memory means in order to recalculate the adjustment parameter after a settling time on the basis of the settled and unsettled weight signals.

5. In a combination weighing machine the improvement as defined in claim 2 wherein the recalculating means recalculates a running, averaged adjustment parameter.

6. The improvement of claim 5 wherein the averaged adjustment parameter is weighted more heavily by recent events.

7. In a combination weighing machine, the improvement as defined in claim 2 wherein the means for quantitatively adjusting employs a first order correction parameter.

8. In a combination weighing machine, the improvement as defined in claim 1 wherein the adaptive weight signal correcting means comprises means for adjusting an indicated weight signal by a historically determined corrective value during a first cycle of operation when a quantity of product is deposited in the scale; means for recalculating the corrective value during a second, subsequent cycle of operation when the deposited quantity of product is retained from the first cycle, and the indicated weight signal has settled, the search control means being connected to receive the adjusted weight signal from the adjusting means in the first cycle in order to search for the selected combination, and being connected with the scale to receive the settled weight signal in the second, subsequent cycle in order to search for the selected combination.

9. In a combination weighing machine, the improvement as defined in claim 1 wherein the adaptive weight signal correcting means includes:
first means receiving first indicated weight signal from a scale during a first cycle of operation after a new quantity of product is deposited in the scale for quantitative adjustment of the weight signal by an adjustment parameter; and
second means receiving a second indicated weight signal from the scale during a subsequent cycle of operation if the previously deposited quantity of product has not been dumped for recalculating the adjustment parameter from the first and second signals.

10. In a combination weighing machine, the improvement of claim 9 wherein the second means includes calculating means for establishing the adjustment parameter from a historical series of said first and second signals from the scale.

11. The improvement of claim 10 wherein the calculating means establishing the adjustment parameter renders the more recent first and second signals in the historical series more significant.

12. In a combination weighing machine, the improvement as defined in claim 1 further including signal sampling means connected with the scales and having variable sampling periods for sampling the indicated weight signals during selected sampling periods in each cycle of operation, and averaging means for establishing average signal levels and corresponding weights from the sampled weight signals; and the adaptive weight signal correcting means includes means for establishing a short sampling period for a scale during a first cycle of operations when a new quantity of product is deposited in the scale, and for establishing a long sampling period for the same scale during a subsequent cycle of operation if the previously deposited quantity of product has not been dumped from the scale.

13. In a combination weighing machine, the improvement of claim 12 wherein the adaptive weight signal correcting means includes
first means receiving the indicated weight signal from a short sampled period during the first cycle operation for quantitative adjustment of the signal by an adjustment parameter; and
second means receiving the indicated weight signal from a long sampling period for recalculating the adjustment parameter.

14. A method of operating a combination weighing machine at a high cyclic rate, the machine having a plurality of scales which are loaded with small quantities of product and then dumped in selected combinations determined in a search operation to produce charges of product approximately equal to a given target weight, each scale of the plurality producing an indicated weight signal representative of the quantity of product in a scale comprising:
reading an unsettled weight signal from a scale immediately after a quantity of product is loaded into the scale;
adjusting the unsettled weight signal from the scale by means of a corrective parameter to obtain a corrected weight signal for the scale;
using the corrected weight signal in a search operation to establish the selected combination of scales to produce a charge of product;
dumping the scale if the corrected weight signal combines appropriately with the weight signals of other scales to form a charge of product at or near the target weight;
retaining the quantity of product in the scale if the corrected weight signal does not combine appropriately with the signals of other scales to form the charge of product;
reading the weight signal from the scale again if the scale has been retained to obtain a settled weight signal; and
calculating a new corrective parameter based upon the difference between the settled and unsettled weight signals.

15. A method of operating a combination weighing machine as defined in claim 14 wherein the step of reading an unsettled weight signal is performed in one cycle of machine operation, and the step of reading the weight signal again to obtain a settled weight signal is performed in a subsequent cycle of machine operation.

16. A method of operating a combination weighing machine as defined in claim 15 further including the step of using the settled weight signal in the search operation performed during said subsequent cycle of machine operation.

17. A method of operating a combination weighing machine as defined in claim 14 wherein the step of calculating a new corrective parameter comprises calculating a new corrective parameter based upon a plurality of the differences between the settled and unsettled weights read from the scale in prior cycles of operation.

18. A method of operating a combination weighing machine as defined in claim 17 wherein the step of calculating is based upon a weighted average of the differences between the settled and unsettled weights, in which average the more recent differences have greater significance.

19. In a combination weighing machine that composes a charge of product closely approximating a target weight by selecting from among a plurality of smaller quantities of the product in a cyclic operation, and having a plurality of weigh scales receiving and weighing a quantity of product and providing an indicated weight signal representative of the quantity in the scale, the indicated weight signals being utilized in a combination search operation to identify the selected combination to be dumped to form the charge in each cycle of operation, the improvement comprising:

reading a first indicated weight signal from the scale during a first cycle of operation when a new quantity of product is deposited in the scale, and quantitatively adjusting the received weight signal by an adjustment parameter;

reading a second indicated weight signal from the scale during a subsequent cycle of operation if the previously deposited quantity of product has not been dumped;

recalculating the adjustment parameter based upon the difference between the first and second indicated weight signals; and using the recalculated adjustment parameter for quantitative adjustment of the indicated weight signal read from the scale after another new quantity of product is deposited in the scale.

20. In a combination weighing machine, the improved method of claim 19 wherein the step of recalculating includes establishing the adjustment parameter from a historical series of the first and second weight signals from the scale.

21. In a combination weighing machine, the improvement as defined in claim 2 wherein the means for quantitatively adjusting employs a plurality of adjustment parameters in combination.

* * * * *